C. E. KLINE.
WEED CUTTER.
APPLICATION FILED SEPT. 22, 1913.
1,111,908.
Patented Sept. 29, 1914.
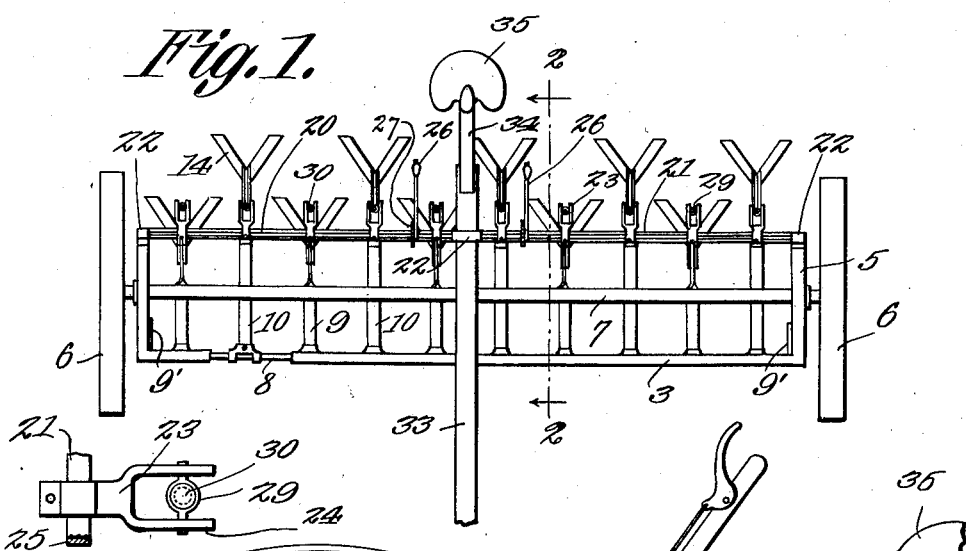
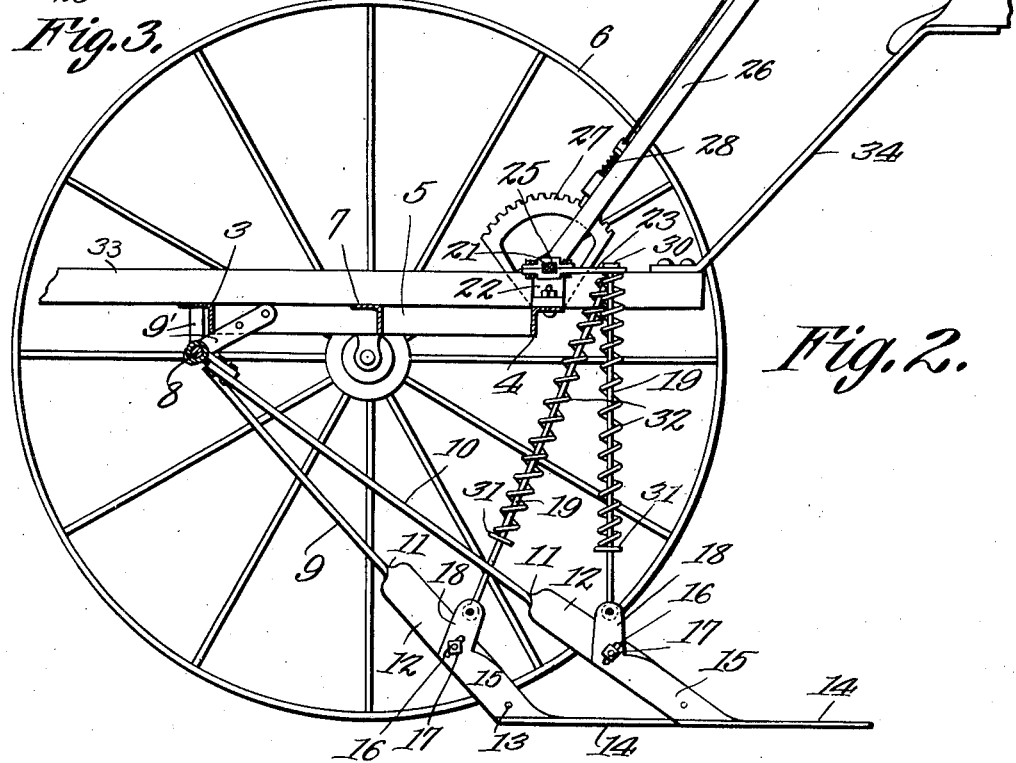
Witnesses
T. B. Wooden.
Marian Moore
Charles E. Kline
Inventor,
by C. A. Snow & Co.
Attorneys.

UNITED STATES PATENT OFFICE.

CHARLES E. KLINE, OF BURKE, WASHINGTON.

WEED-CUTTER.

1,111,908.	Specification of Letters Patent.	Patented Sept. 29, 1914.

Application filed September 22, 1913. Serial No. 791,146.

*To all whom it may concern:*

Be it known that I, CHARLES E. KLINE, a citizen of the United States, residing at Burke, in the county of Grant and State of Washington, have invented a new and useful Weed-Cutter, of which the following is a specification.

This invention relates to improvements in weed cutting machines.

One object of the present invention is to provide an apparatus of the class described in which the weed cutting knives are angularly adjustable to the ground so that they may incline downwardly with respect thereto so as to be driven into the ground while being drawn forwardly.

A further object of the invention is to provide mechanism of the class stated in which cutter knives are alternately arranged, the alternate knives being arranged in front of the intermediate ones whereby sufficient clearance will be had between the two sets of knives to allow the cut material to escape therebetween.

A further object of the invention is to provide a weed cutter comprising a plurality of weed cutting knives which may be raised above the ground when not in use or may be lowered in contact therewith and furthermore, the said knives are adjustable with relation to the ground and may be rigidly held in such relation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of an apparatus constructed in accordance with my invention. Fig. 2 is a cross sectional view thereof taken along the line 2—2 of Fig. 1. Fig. 3 is a detail view in plane, of the lifting arms and their mountings.

Referring to the drawings in which similar reference numerals designate corresponding parts throughout the several views, a frame is provided and includes front and rear members 3 and 4 and the side bars 5 extending therebetween, and secured thereto. Suitable wheels 6 are rotatably secured to the side pieces 5 and mount the weeder for movement over the ground. In order to strengthen the construction of the frame, the center bar 7 is provided and extends between the side pieces 5. Positioned beneath the front member 3 is the shaft 8 rotatably supported in such position, by means of the downwardly extending arms 9' which are secured to the side pieces 5. The shaft 8 extends the entire longitudinal distance of the frame and rotatably secured thereto are the suspension arms 9 and 10 which are spaced a suitable distance apart along the entire shaft 8. The suspension arms 9 are formed of wide and thin material and are twisted at a point 11 so as to form the cutter blade 12, the lower front edge of which is sharpened so as to cut material which may come in contact therewith.

Connected to the lower extremity of the cutting blades 12 are the pivotal bolts or rivets 13 which secure the outstanding cutting wings 14 to the said cutting blades. There are two cutting wings secured to each cutting blade and these are positioned upon opposite sides thereof and diverge outwardly therefrom in a V-shaped manner, as illustrated in Fig. 1. The cutting wings 14 are formed of broad thin material and are twisted to form the upwardly extending arm 15, the latter being the one which is pivotally secured to the cutting blade 12. The arm 15 is provided with an arcuated slot 16 extending therethrough which is engageable by the bolt 17 whereby the angular position of the cutting wing with respect to the horizontal may be regulated for the purposes more clearly hereinafter set forth. The arm 15 is bent upwardly above the arcuated slot 16 as at 18 and to it is pivotally secured the lower end of the raising rod 19. As will be apparent, from Fig. 2, the suspension arm 10 is considerably longer than the suspension arm 9 so that the suspension arms 10 which are the alternate ones, will contact with the ground at a point nearer the rear of the mechanism than will the intermediate arms 9. Thus considerable clearance will be provided between the cutting wings 14 of the alternate and intermediate arms 10 and 9 respectively.

Rotatably secured to the rear member 4 are the longitudinally extending shafts 20 and 21 which extend to opposite sides of the center of the frame. The shafts 20 and 21 are rotatably mounted upon suitable bearings 22, illustrated in Fig. 2, and to these shafts are secured rearwardly extending lifting arms 23, which as illustrated in Figs. 1 and 3, are bifurcated as at 24 at their rear extremities. The shafts 20 and 21, intermediate of their ends, are of rectangular cross section as at 25, and provide a suitable gripping surface to which the arms 23 may be secured.

Operating levers 26 are provided and are rigidly secured to the shafts 20 and 21, and by reason of suitable racks or sectors 27 secured to the machine frame and the pawls 28 secured to the lever, the shafts 20 and 21 may be held in any desired position. The provision of two separate shafts 20 and 21 allows the weed cutter at one side of the machine to be moved upwardly independent of the remaining cutters, the advantage of which will be readily appreciated.

The extreme ends of the lifting arms 23 are bifurcated and as clearly illustrated in Fig. 3, are provided with a ring 29 pivotally secured to the projecting prongs thereof. The rings 29 are adapted to receive and slidably support the raising rods 19 which pass therethrough. The rods 19 are provided with the circular head 30 which prevents them from being entirely disengaged from the pivoted rings 29. The raising rods 19 are each provided with a collar or shoulder 31 rigidly secured adjacent the lower extremities thereof and against these abut the compression helical springs 32, the upper extremities of which contact with the bifurcated arms 23. A suitable traction rod or member 33 extends centrally across the machine frame and to the extremity of this is secured the seat bar 34, with the seat 35 located at the upper extremity thereof, whereby the operator is located in the position to operate either of the levers 26 and at the same time in plain sight of the action of the cutting members.

From the foregoing description taken in connection with the drawings, it will be apparent that a most efficient weed cutting machine has been provided and furthermore, the adjustable manner in which the cutting wings are secured to the cutting blades 12 allows the angular position of the cutting wings to be adjusted taken with respect to the horizontal, so that when the soil is of a loose nature, the blades will incline forwardly with the result that the said wings will bury themselves beneath the surface of the ground and will cut the weeds beneath the surface as the entire machine is drawn forwardly through the medium of the traction bar 33 to which suitable draft animals may be secured. Furthermore, the compression springs and manner in which the raising rods are supported, allow the cutting blades 12 and wings secured thereto, to be raised about the shaft 8 as a center when the former encounter some obstacle, allowing the blades and wings to ride thereover. Thus it will be apparent no matter what the position of the lever 26, the cutting blades and knives may if they encounter some obstacle move upwardly with the result that the helical springs 32 will be compressed, so that the knives and blades will be immediately lowered to their original position after the said blades have passed beyond the obstacle. The sharpened front edge of the cutting blade 12 is adapted to sever any material which may come in contact therewith.

Having thus fully described the invention, what is claimed is:

1. A machine of the class described, comprising a frame, a shaft rotatably secured thereto and extending along the front edge thereof, a second shaft extending along and rotatably secured to the rear edge thereof, a suspension arm carried by the first mentioned shaft, outstanding oppositely extending sharpened wings carried by said suspension arm, a lifting arm rigidly secured to the said second mentioned shaft, a raising rod pivotally secured to said outstanding wings and resiliently secured to the said lifting arm.

2. A machine of the class described, comprising a frame, a shaft rotatably secured thereto and extending along the front edge thereof, a second shaft extending along and rotatably secured to the rear edge thereof, a suspension arm carried by the first mentioned shaft, outstanding oppositely extending sharpened wings carried by said suspension arm, a lifting arm rigidly secured to the said second mentioned shaft, a raising rod pivotally secured to said outstanding wings pivotally and slidably engaging the said lifting arm of the rear shaft, and resilient means secured to said arm and engaging the said raising rod holding the same against sliding motion with respect to said sliding arm.

3. A device of the class described, comprising suspension arms formed of wide plates, said plates twisted intermediate their ends through substantially 90 degrees and forming lower sharpened cutting blades, means carried at the upper ends of said arms for pivotally securing the same to a supporting structure, each of said arms provided with a pair of cutting wings arranged upon and pivotally secured to opposite sides of said cutting blade portion of the suspension arms, said cutting wings terminating in upstanding portions, means engaging the upstanding portions of the cutting wings for locking the same in adjusted position to the said cutting blade portion of the suspension arms, said cutting wings defining a V-shaped horizontally extending cutter with the lower cutting blade portion of a suspension arm upstanding therefrom at the apex thereof.

In testimony that I claim the foregoing as my own, I have hereto affixed my signature in the presence of two witnesses.

CHARLES E. KLINE.

Witnesses:
 WALTER CARTER,
 JOHN CARTER.